(12) United States Patent  
Marchesotti et al.

(10) Patent No.: US 9,275,301 B2  
(45) Date of Patent: Mar. 1, 2016

(54) METHOD AND SYSTEM FOR CREATING DIGITAL IMAGE ALBUM

(71) Applicants: Luca Marchesotti, Grenoble (FR); Craig J. Saunders, Grenoble (FR)

(72) Inventors: Luca Marchesotti, Grenoble (FR); Craig J. Saunders, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 620 days.

(21) Appl. No.: 13/644,525

(22) Filed: Oct. 4, 2012

(65) Prior Publication Data

US 2014/0099037 A1  Apr. 10, 2014

(51) Int. Cl.
  *G06F 7/06* (2006.01)
  *G06K 9/62* (2006.01)
  *G06Q 10/10* (2012.01)
  *G06Q 30/02* (2012.01)

(52) U.S. Cl.
  CPC .............. *G06K 9/6201* (2013.01); *G06Q 10/10* (2013.01); *G06Q 30/02* (2013.01)

(58) Field of Classification Search
  CPC ..... G06Q 10/101; G06Q 30/02; G06Q 50/01; G06F 7/06; G06F 7/10; G06F 7/76; G06F 17/3005; G06F 17/30244; G06F 2216/01
  See application file for complete search history.

(56) References Cited

U.S. PATENT DOCUMENTS

| | | | |
|---|---|---|---|
| 6,636,648 B2 | 10/2003 | Loui et al. | |
| 7,197,459 B1* | 3/2007 | Harinarayan et al. | 704/270.1 |
| 7,243,303 B2 | 7/2007 | Purvis et al. | |
| 7,451,140 B2 | 11/2008 | Purvis et al. | |
| 8,170,897 B1* | 5/2012 | Cohen et al. | 705/7.13 |
| 8,724,910 B1* | 5/2014 | Pillai et al. | 382/225 |
| 2003/0048950 A1* | 3/2003 | Savakis et al. | 382/225 |
| 2010/0215279 A1 | 8/2010 | Gao et al. | |
| 2010/0303342 A1* | 12/2010 | Berg et al. | 382/155 |
| 2014/0081717 A1* | 3/2014 | Lu et al. | 705/12 |

OTHER PUBLICATIONS

Hoi et al. (2008) "Semi-supervised ensemble ranking." Proc. 23$^{rd}$ Nat'l Conf. on Artificial Intelligence, vol. 2 pp. 634-639.*
J.A. Aslam and M. Montague. Models for metasearch. In Proceedings of the 24th annual international ACM SIGIR conference on Research and development in information retrieval, pp. 276-284. ACM, 2001.
Y.T. Liu, T.Y. Liu, T. Qin, Z.M. Ma, and H. Li. Supervised rank aggregation. In Proceedings of the 16th international conference on World Wide Web, pp. 481-490. ACM, 2007.
M. Montague and J.A. Aslam. Condorcet fusion for improved retrieval. In Proceedings of the eleventh international conference on Information and knowledge management, pp. 538-548. ACM, 2002.
F.Wei, W. Li, and S. Liu. irank: A rank-learn-combine framework for unsupervised ensemble ranking. Journal of the American Society for Information Science and Technology, 61(6):1232-1243, 2010.

* cited by examiner

*Primary Examiner* — Andrew W Johns

(57) ABSTRACT

The disclosed embodiments related to a method and system for creating a digital image album implementable on a computing device. The method includes grouping a plurality of digital images to generate a plurality of groups. Each of the plurality of groups is then transmitted to one or more crowdworkers for ranking each digital image of the plurality of groups. A final rank corresponding to each of the plurality of digital images is then determined based on the one or more ranks assigned by the one or more crowdworkers to each digital image of the plurality of groups. Thereafter, at least one digital image is selected from each of the plurality of groups based on the final rank of at least one digital image to create the digital image album.

12 Claims, 10 Drawing Sheets

METHOD AND SYSTEM FOR CREATING DIGITAL IMAGE ALBUM

TECHNICAL FIELD

The presently disclosed embodiments are related to a crowdsourcing process. More particularly, the presently disclosed embodiments are related to a method and system for creating a digital image album by crowdsourcing.

BACKGROUND

Photographs are a representation of a person's life and carry significant emotional value. Over the years, a person ends up collecting hundreds of photographs, which subsequently have to be organized for storage and viewing purposes. The most common manner of organizing these photographs is to place them in albums. However, it is known that although many people collect photographs, few invest time on a regular basis to organize and maintain the photographs. Moreover, with time, the number of unorganized photographs increase, making it immensely difficult to keep the collection organized. Therefore, there is a need to provide efficient techniques for organizing a collection of photographs.

SUMMARY

According to embodiments illustrated herein, there is provided a method implementable on a computing device for creating a digital image album. The method includes grouping a plurality of digital images to generate a plurality of groups. Each of the plurality of groups is then distributed to one or more crowdworkers for ranking each digital image of the plurality of groups. A final rank corresponding to each of the plurality of digital images is then determined based on the one or more ranks assigned by the one or more crowdworkers to each digital image of the plurality of groups. Thereafter, at least one digital image is selected from each of the plurality of groups based on the final rank of at least one digital image to create the digital image album.

According to embodiments illustrated herein, there is provided a system for creating a digital image album. The system includes grouping module, a distribution module, a ranking module, and an album creation module. The grouping module is configured for grouping a plurality of digital images to generate a plurality of groups. The distribution module is configured for distributing each group of the plurality of groups to one or more crowdworkers for ranking each digital image of the plurality of groups. The ranking module is configured for assigning a final rank to each digital image of the plurality of groups based on one or more ranks assigned by one or more crowdworkers to each digital image. Lastly, the album creation module is configured for creating the digital image album with at least one digital image selected from each of the plurality of groups based on the final rank assigned to each digital image.

According to the embodiments illustrated herein, there is provided a computer program product for use with a computer for creating a digital image album. The computer readable program code includes program instruction means for grouping a plurality of digital images to generate a plurality of groups. The computer readable program code further includes program instruction means for communicating each of the plurality of groups to one or more crowdworkers for ranking each digital image of the plurality of groups. The computer readable program code further includes program instruction means for determining a final rank corresponding to each of the plurality of digital images based on one or more ranks assigned by one or more crowdworkers to each digital image of the plurality of groups. The computer readable program code further includes program instruction means for selecting at least one digital image from each of the plurality of groups based on the final rank of at least one digital image to create the digital image album.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
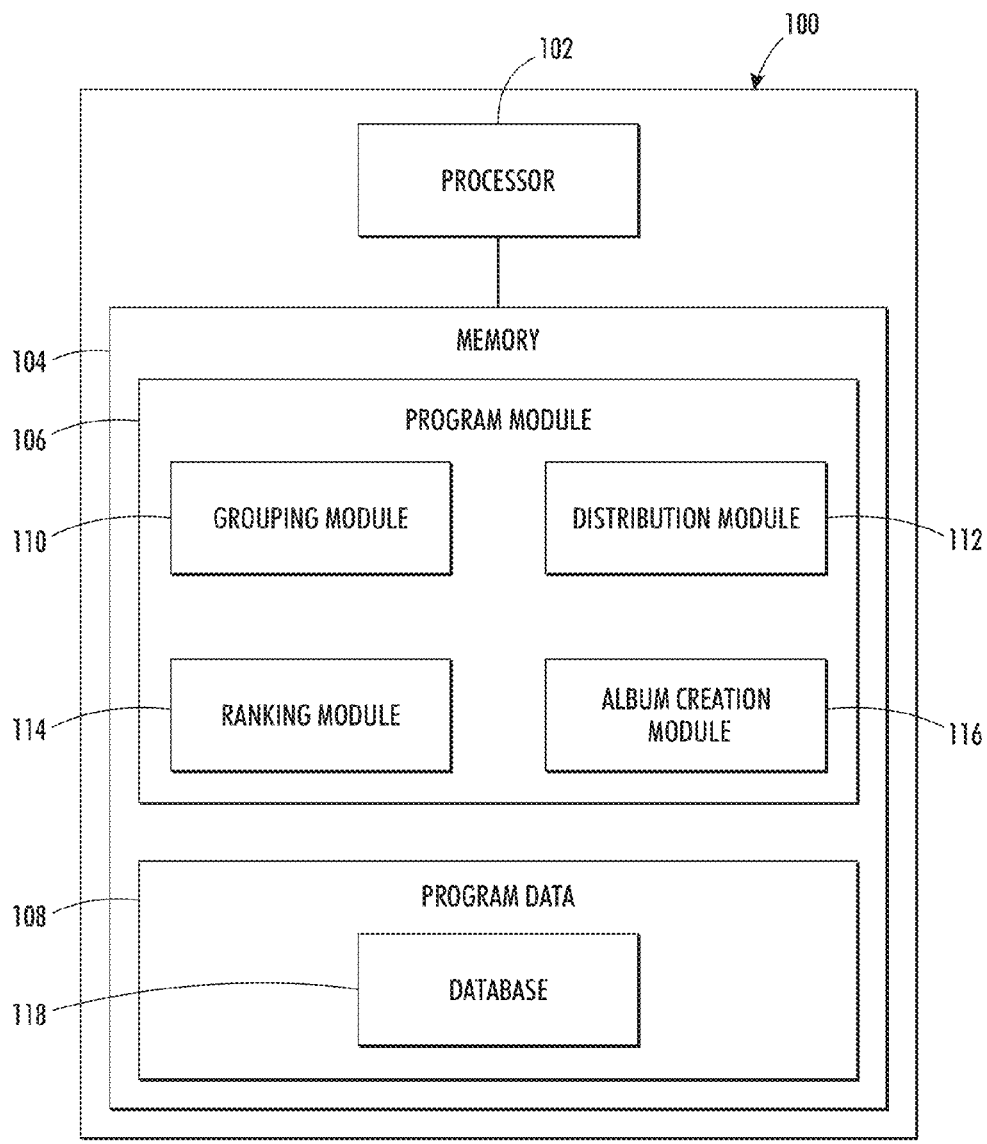
FIG. 1 is a block diagram illustrating a system for creating a digital image album in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes, as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meaning set forth below.

"Crowdsourcing" refers to distributing tasks by soliciting the participation of defined groups of users. A group of users may include, for example, individuals responding to a solicitation posted on a certain website, such as Amazon Mechanical Turk or Crowd Flower.

"Crowdworkers" refer to a worker or a group of workers that may perform one or more tasks that generate data that contribute to a defined result, such as proofreading part of a digital version of an ancient text or analyzing a small quantum of a large volume of data. According to the present disclosure, the crowdsourced workforce includes, but is not limited to, a satellite centre employee, a rural BPO (Business Process Outsourcing) firm employee, a home-based employee, or an internet-based employee. Hereinafter, "crowdsourced workforce," "crowdworker," and "crowd" may be interchangeably used.

"Task" refers to work which needs to be completed by crowdworkers. According to the present disclosure, the task corresponds to an activity of the arranging/ordering/ranking of each digital image in a plurality of groups. In an embodiment, the task includes a group of the plurality of groups containing digital images. The task further includes an option for facilitating the activity of arranging/ordering/ranking of the digital images in the group. Similarly, separate such tasks are created for different groups and distributed to the crowdworkers.

"Digital image" refers to a collection of data, including image data in any format, retained in an electronic form. The digital image contains one or more pictures. In an embodiment, the digital image is obtained by scanning a corresponding physical document. The digital image can be stored in various file formats such as, JPG or JPEG, GIF, TIFF, PNG, BMP, RAW, PSD, PSP, and PDF.

FIG. 1 is a block diagram illustrating a system 100 for creating a digital image album in accordance with at least one embodiment.

The system 100 includes a processor 102 and a memory 104. The processor 102 is coupled with the memory 104. In an embodiment, the system 100 corresponds to a computing device such as, a Personal Digital Assistant (PDA), a Smartphone, a tablet PC, a laptop, a personal computer, a mobile phone, a Digital Living Network Alliance (DLNA)-enabled device, or the like.

The processor 102 is configured to execute a set of instructions stored in the memory 104 to perform one or more operations. The processor 102 fetches the set of instructions from the memory 104 and executes the set of instructions. The processor 102 can be realized through a number of processor technologies known in the art. Examples of the processor include an X86 processor, a RISC processor, or an ASIC processor. In an embodiment, the processor 102 includes a Graphics Processing Unit (GPU) that executes the set of instructions to perform one or more processing operations.

The memory 104 is configured to store the set of instructions or modules. Some of the commonly known memory implementations can be, but are not limited to, a random access memory (RAM), a read-only memory (ROM), a hard disk drive (HDD), and a secure digital (SD) card. The memory 104 includes a program module 106 and a program data 108. The program module 106 includes a set of instructions that can be executed by the processor 102 to perform specific actions on the system 100. The program module 106 includes a grouping module 110, a distribution module 112, a ranking module 114, and an album creation module 116.

The program data 108 includes a database 118. The database 118 is a storage medium that stores the data submitted from and/or required by the grouping module 110, the distribution module 112, the ranking module 114, and the album creation module 116. In an embodiment, the database 118 can be implemented using technologies, including, but not limited to, Oracle®, IBM DB2®, Microsoft SQL Server®, Microsoft Access®, PostgreSQL®, MySQL®, and SQLite®.

Figure 2:
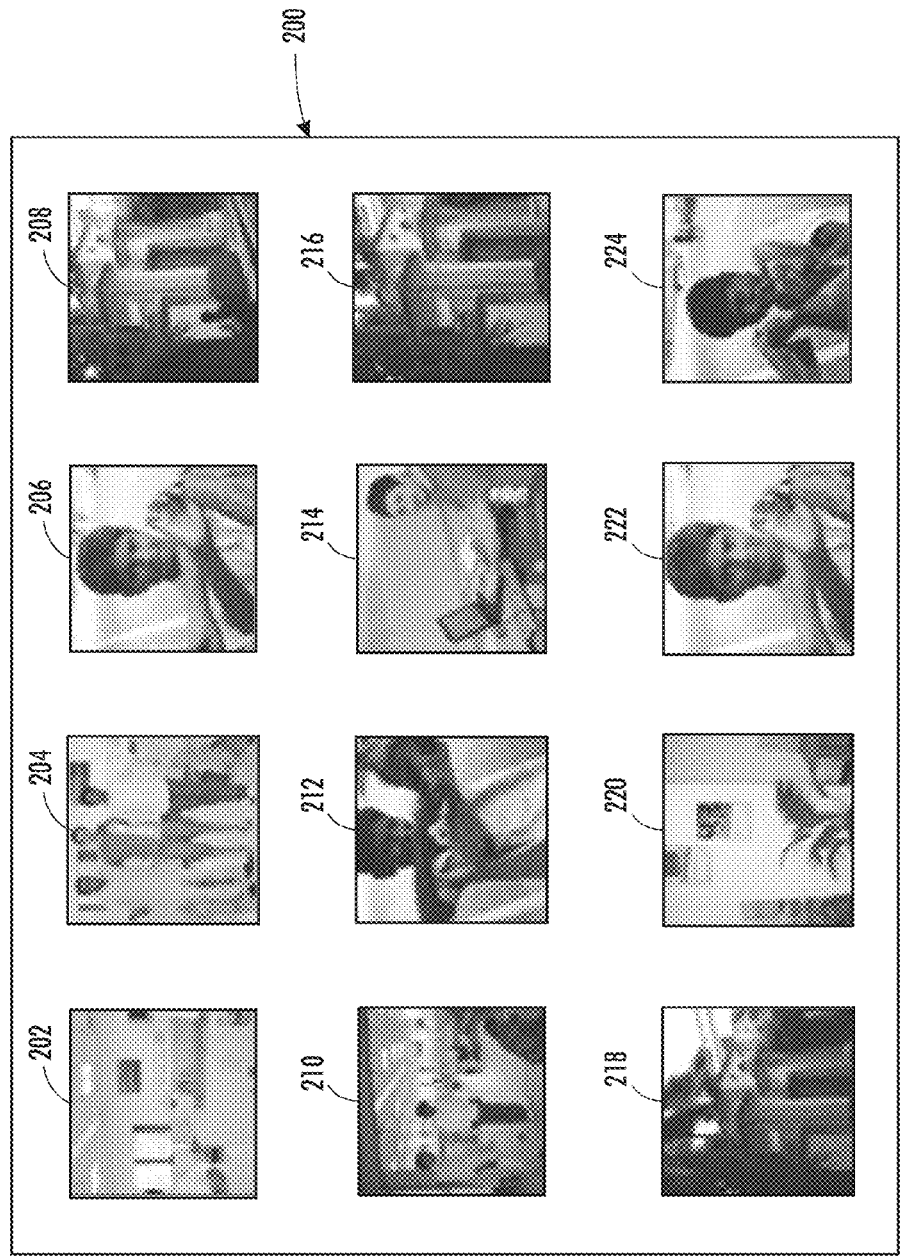
FIG. 2 depicts a plurality of digital images in accordance with at least one embodiment.

FIG. 2 depicts a plurality of digital images 200 in accordance with at least one embodiment. The plurality of digital images 200 may be captured using digital cameras or other image capture devices, or they may be obtained from the internet or other communication channels, or they may be scanned from film or paper prints. The plurality of digital images 200 includes digital images 202, 204, 206, 208, 210, 212, 214, 216, 218, 220, 222, and 224. Although the plurality of digital images 200 shows a limited number of digital images for simplicity, it should be apparent that the disclosed embodiments could be implemented for a large or lesser number of digital images. In an embodiment, the plurality of digital images 200 is stored in the database 118.

Referring back to FIG. 1, the grouping module 110 is configured for grouping the plurality of digital images 200. In an embodiment, the plurality of digital images 200 is present in an unorganized form. The grouping module 110 retrieves the plurality of digital images 200 from the database 118 and thereafter performs the grouping of the plurality of digital images 200 to group the plurality of digital images 200 into coherent and visually similar groups. The grouping module 110 thereby groups the plurality of digital images 200 in a plurality of groups. In an embodiment, the plurality of groups include a first group 302, a second group 304, and a third group 306, as shown in FIGS. 3a, 3b, and 3c.

In an embodiment, the grouping module 110 may group the plurality of digital images 200 into the plurality of groups (the first group 302, the second group 304, and the third group 306) based on a first set of criteria. According to the first set of criteria, the digital images with a common visual characteristic are grouped together. Therefore, based on the first set of criteria, the grouping module 110 creates the plurality of groups wherein each group of the plurality of groups contains a sub-set of digital images from the set of digital images of the plurality of digital images 200 having the common visual characteristic. It will be apparent to a person having ordinary skill in the art that the grouping module 110 may group the plurality of digital images 200 based on various features (e.g., color, theme, objects within the digital image, etc.).

Figure 3A:
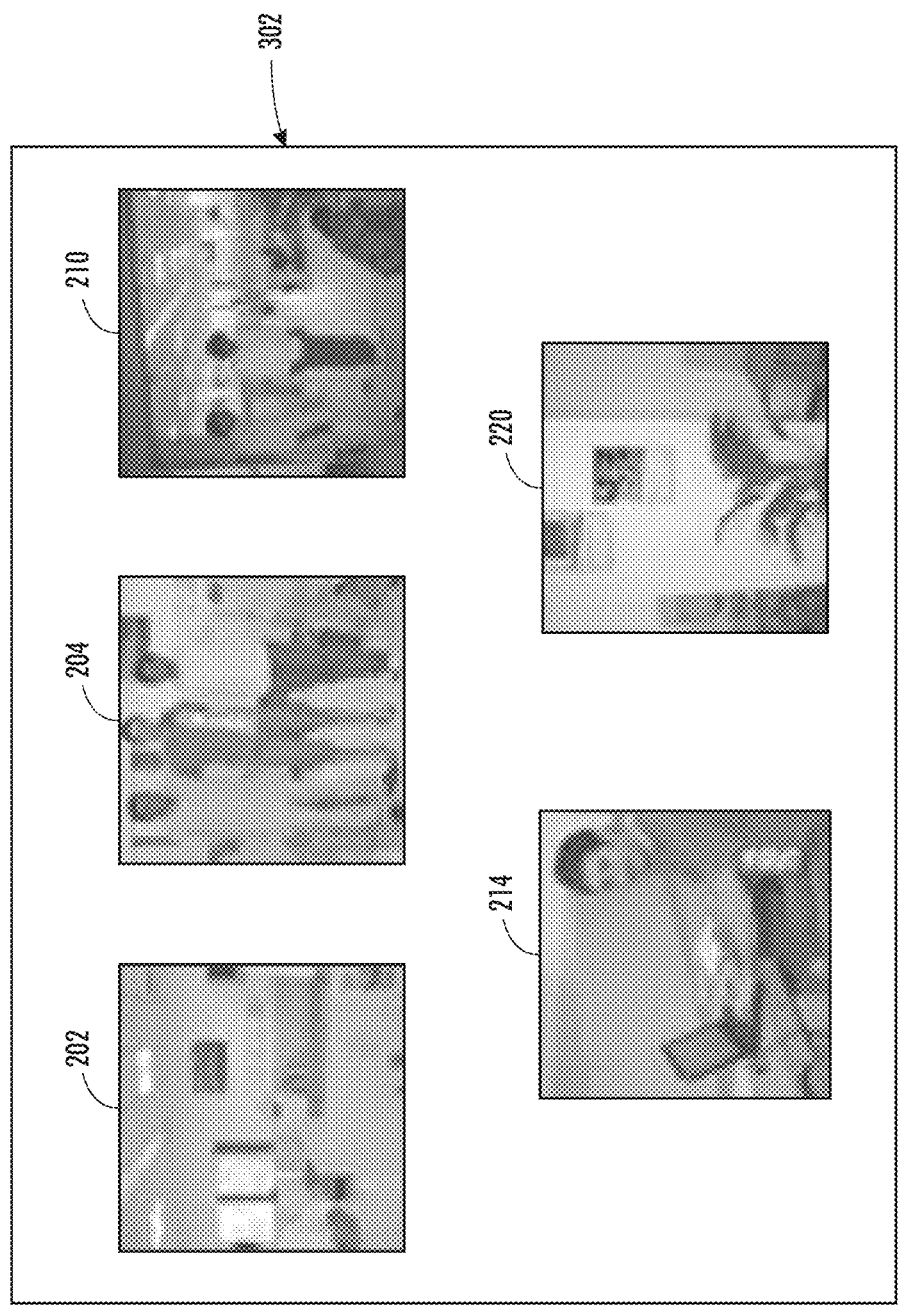
FIG. 3a depicts a first group of digital images of the plurality of digital images in accordance with at least one embodiment.
Figure 3B:
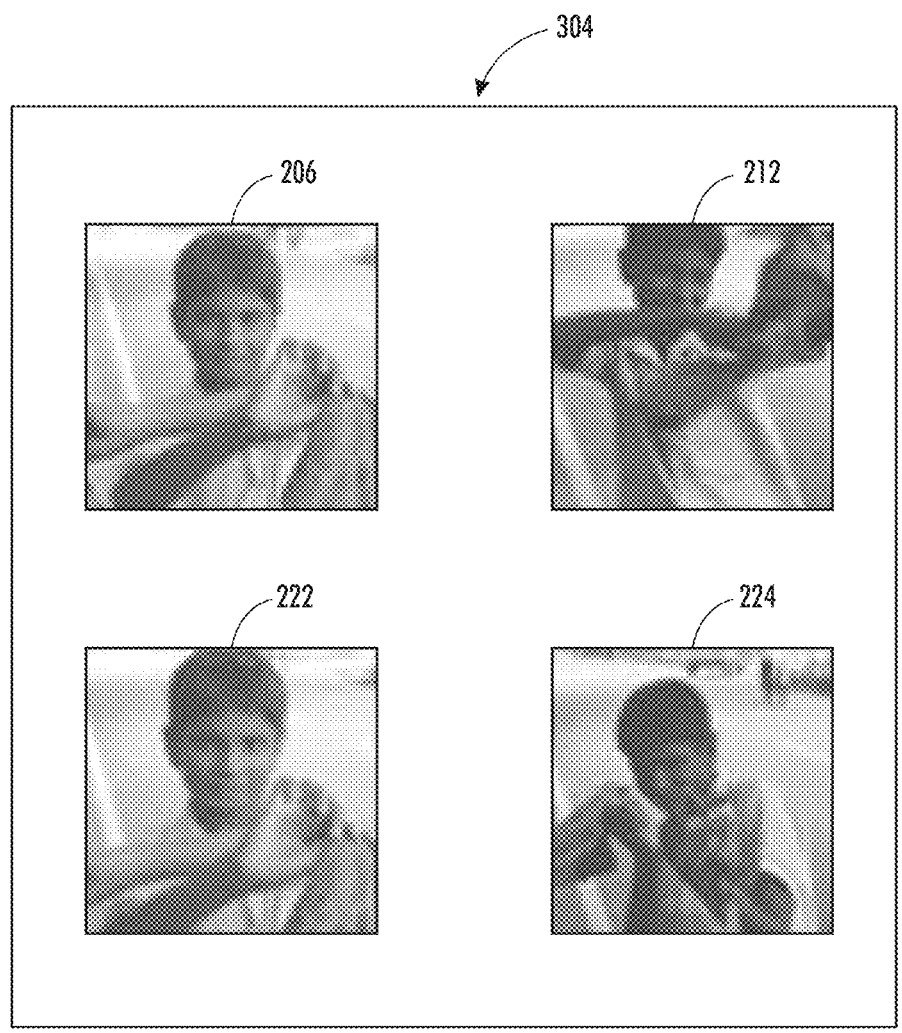
FIG. 3b depicts a second group of digital images of the plurality of digital images in accordance with at least one embodiment.
Figure 3C:
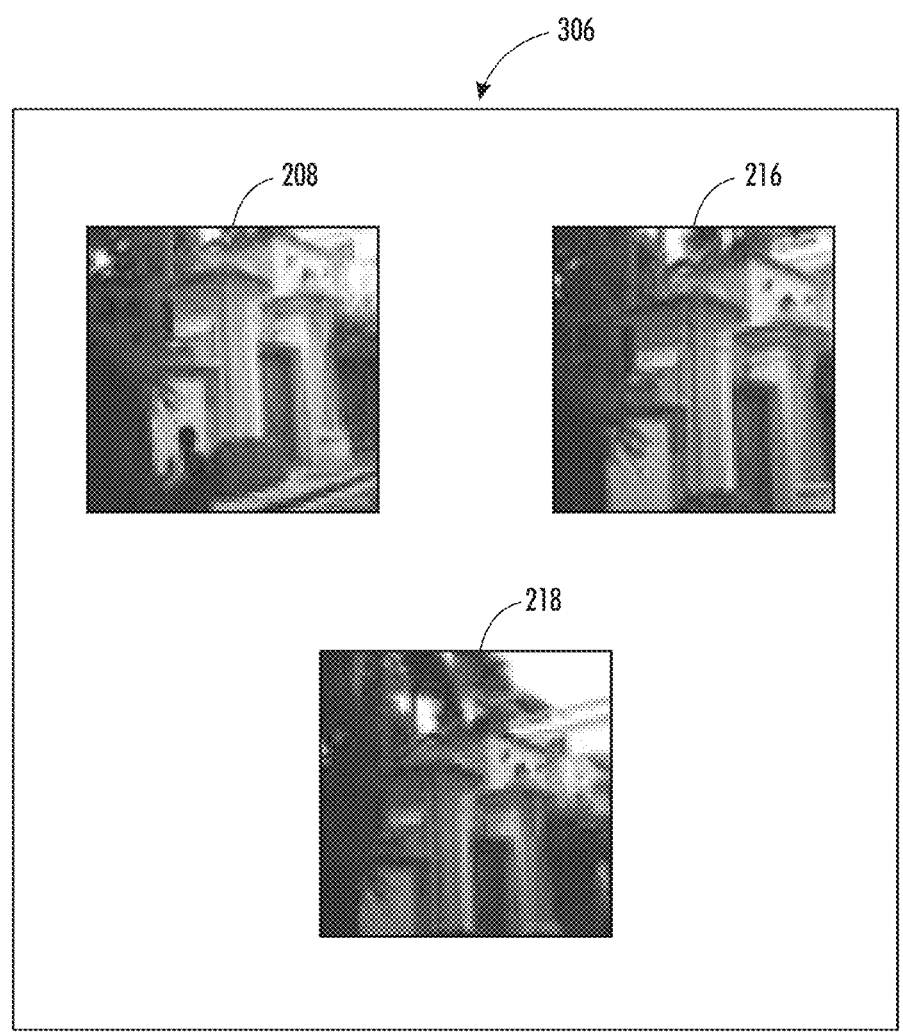
FIG. 3c depicts a third group of digital images of the plurality of digital images in accordance with at least one embodiment.

As represented in FIGS. 3a, 3b, and 3c, each of the plurality of groups (the first group 302, the second group 304, and the third group 306) is designed to ideally group together digital images the plurality of digital images 200 having the common visual characteristics. The digital images of the plurality of digital images 200 include the common visual characteristics corresponding to a single person, a single location, or the like in the plurality of digital images 200. It will also be understood by a person having ordinary skill in the art that in another embodiment, the plurality of digital images 200 can be grouped together based on attributes such as such as digital image quality, spatial color distribution, texture, shape, geometry, or the like in to plurality of groups. In an embodiment, the first group 302 includes the digital images 202, 204, 210, 214, and 220 as shown in FIG. 3a. The second group 304 includes the digital images 206, 212, 222, and 224, as shown in FIG. 3b. The third group 306 includes the digital images 208, 216, and 218, as shown in FIG. 3c. In an embodiment, the plurality of groups 302, 304, and 306 are stored in the database 118.

Referring back to FIG. 1, in an embodiment, the grouping module 110 can be implemented using various grouping techniques capable of grouping the plurality of digital images 200.

In another embodiment, the grouping module 110 operates on a plurality of unorganized digital images 200. The grouping module 110 processes the plurality of digital images 200 for removing image noise and downsizing the digital image data. The downsizing can reduce computation cost, and removing the digital image noise makes it easier to capture color distribution. Thereafter, the grouping module 110 computes a color correlogram from image pixel values for each of the digital images, and groups the digital images based on relative similarities of the color correlograms to generate the plurality of groups 302, 304, and 306.

In yet another embodiment, the plurality of digital images 200 may be grouped into the plurality of groups that have the most consistent relationships. One group may not sufficiently describe a broad class of digital images. For instance, mountains in the summer may look very different from snowy mountains in the winter. If presented with both types of digital images, the system 100 may find very few consistent relationships among all the examples of digital images. The system 100 can group the digital images into a plurality of groups where the digital images in each of the groups have many relationships in common. The system 100 can thus build two separate groups for mountains. One groups for mountains in summer and another group for mountains in winter.

The distribution module 112 is configured to transmit each of the plurality of groups (the first group 302, the second group 304, and the third group 306) to one or more crowdworkers. In order to transmit the plurality of groups, the distribution module 112 creates a ranking task corresponding to each of the plurality of groups for the one or more crowdworkers. The ranking task (containing the corresponding group of the plurality of groups) is then distributed to one or more crowdworkers. In an embodiment, the distribution module 112 prepares the ranking tasks, which are then published on a crowdsourcing platform from where it can be accessed by one or more crowdworkers. In an embodiment, Amazon's Mechanical Turk (MTurk) can be used to publish the ranking tasks. In another embodiment, CrowdFlower can be used to publish the ranking tasks. It will be understood by a person having ordinary skills in the art that any suitable crowdsourcing platform can be used to publish the ranking tasks without departing from the scope of the disclosed embodiments. In an embodiment, one or more crowdworkers can access the ranking task, view details about the ranking task, and choose to complete the ranking task for a fee. It will be understood by a person having ordinary skills in the art that the fee for the one or more crowdworkers can be decided by an administrator of the crowdsourcing platform or crowdsourcer (i.e., who publishes the ranking task).

In an embodiment, the ranking task includes two sub-tasks. The first sub-task of the ranking task includes the visualization of each digital image in the corresponding group of the plurality of groups (the first group 302, the second group 304, and the third group 306). The second sub-task of the ranking task includes an option for the arrangement/ordering/ranking of each digital image in the corresponding group of the plurality of groups (the first group 302, the second group 304, and the third group 306). The digital images of the plurality of digital images 200, in the corresponding group of the plurality of groups (the first group 302, the second group 304, and the third group 306) are arranged/ordered based on the ascending or descending order of ranks being assigned to each digital image by the crowdworkers.

In an embodiment, the distribution module 112 facilitates sending of the ranking task to one crowdworker. In another embodiment, the distribution module 112 facilitates sending of the ranking task to multiple crowdworkers.

Figure 4A:
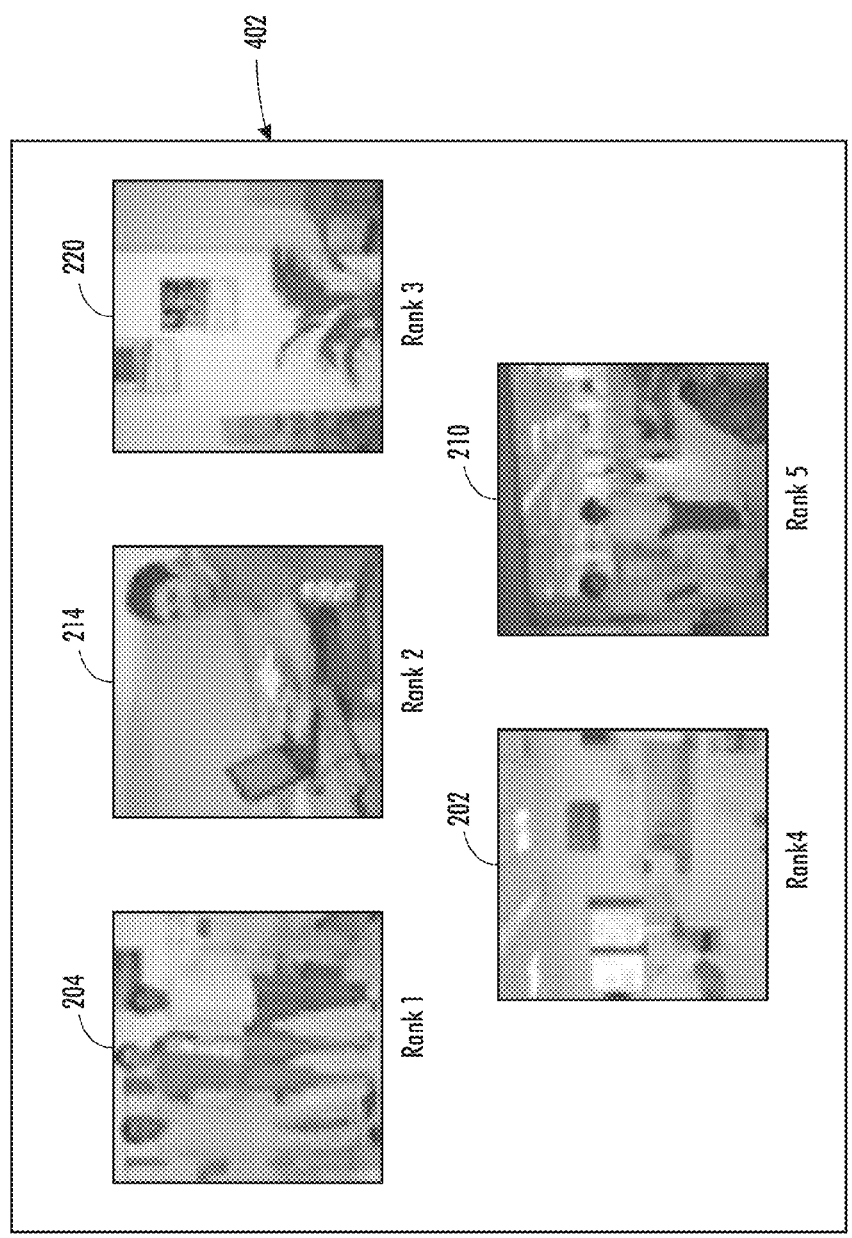
FIG. 4a depicts a ranked first group of digital images of the plurality of digital images in accordance with at least one embodiment.

FIG. 4a depicts a ranked first group 402 of digital images of the plurality of digital images in accordance with at least one embodiment. The ranked first group 402 contains the ranks assigned by a first crowdworker in the following order. The digital image 204 is assigned rank 1, the digital image 214 is assigned rank 2, the digital image 220 is assigned rank 3, the digital image 202 is assigned rank 4, and the digital image 210 is ranked 5 by the first crowdworker based on his/her preference.

Figure 4B:
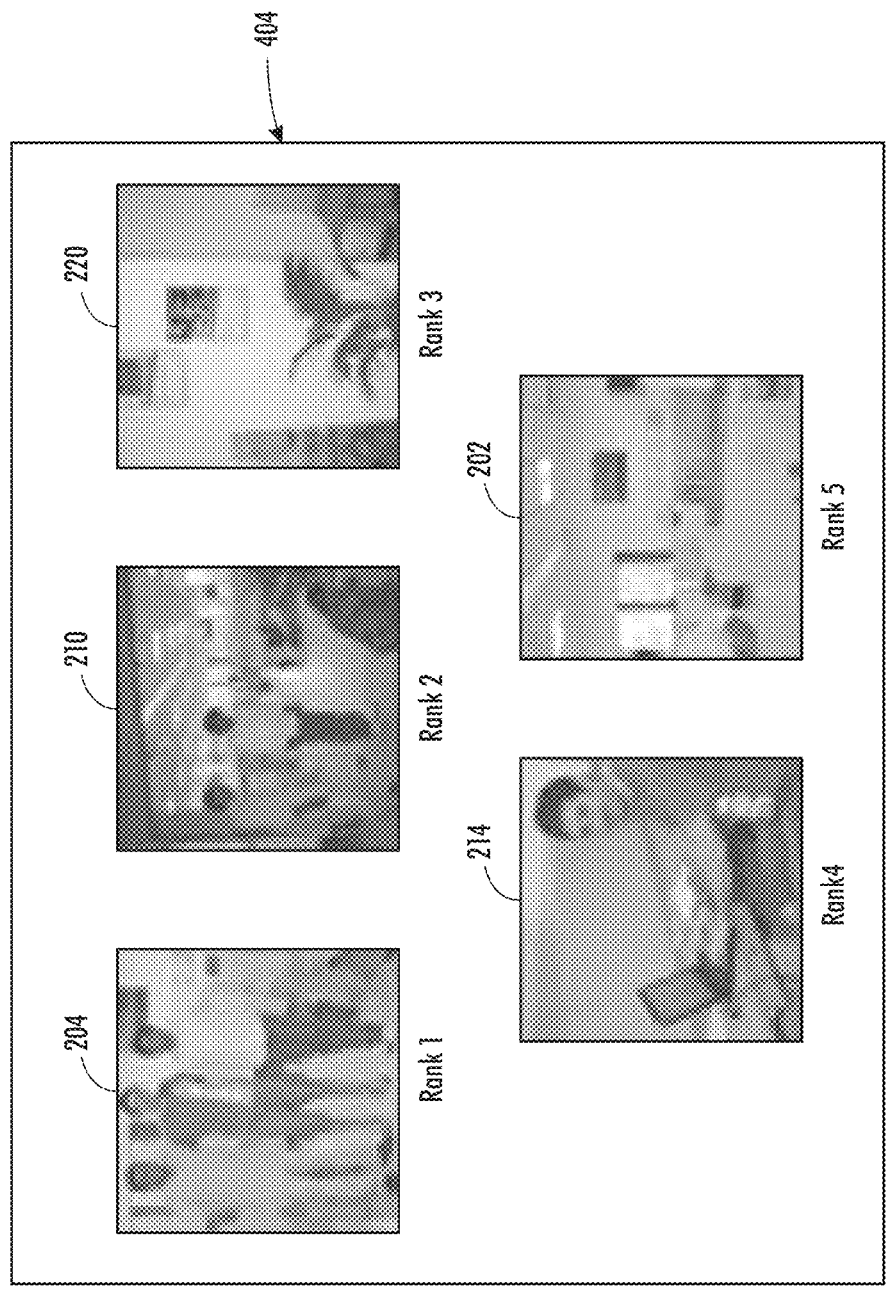
FIG. 4b depicts a ranked first group of digital images of the plurality of digital images in accordance with at least one embodiment.

FIG. 4b depicts a ranked first group 404 of digital images of the plurality of digital images in accordance with at least one embodiment. The ranked first group 404 contains the ranks assigned by a second crowdworker in the following order. The digital image 204 is assigned rank 1, the digital image 210 is assigned rank 2, the digital image 220 is assigned rank 3, the digital image 214 is assigned rank 4, and the digital image 202 is ranked 5 by the second crowdworker based on his/her preference.

Figure 4C:
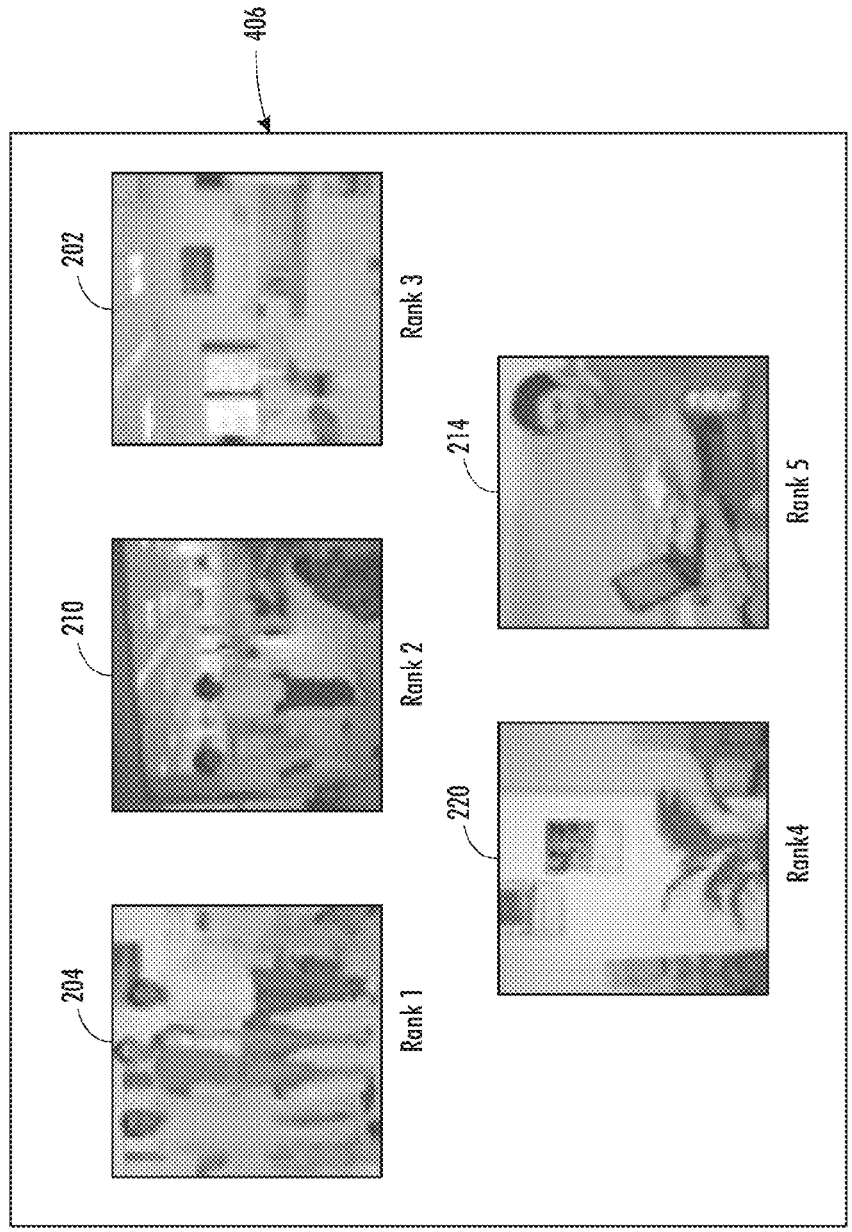
FIG. 4c depicts a ranked first group of digital images of the plurality of digital images in accordance with at least one embodiment.
Figure 5:
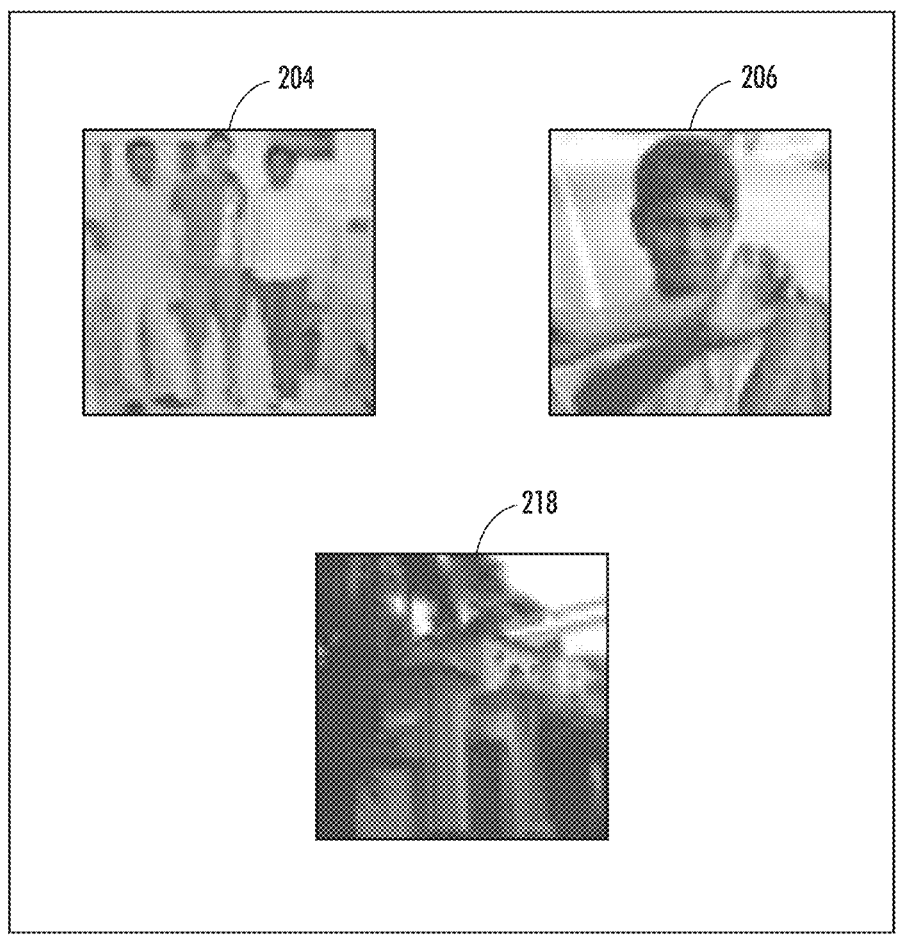
FIG. 5 depicts digital images of the plurality of digital images selected for creating the digital image album in accordance with at least one embodiment.

FIG. 4c depicts a ranked first group 406 of digital images of the plurality of digital images in accordance with at least one embodiment. The ranked first group 406 contains the ranks assigned by a third crowdworker in the following order. The digital image 204 is assigned rank 1, the digital image 210 is assigned rank 2, the digital image 202 is assigned rank 3, the digital image 220 is assigned rank 4, and the digital image 214 is ranked 5 by the third crowdworker based on his/her preference.

Similarly, the digital images of the plurality of digital images 200 in the second group 304 and the third group 306 are ranked by the crowdworkers. The one or more ranks assigned by the one or more crowdworkers to each digital image in each of the plurality of groups (the first group 302, the second group 304, and the third group 306) are stored in the database 118.

Referring back to FIG. 1, the ranking module 114 is configured for assigning a final rank to each digital image of each of the plurality of groups (the first group 302, the second group 304, and the third group 306). The ranking module 114 assigns the final rank based on one or more ranks assigned by multiple crowdworkers to each digital image of the plurality of digital images 200. In an embodiment, the ranking module 114 is implemented using any suitable technique to combine the ranking to generate the final rank for each digital image in each of the plurality of groups.

According to the present disclosure, the ranking module 114 can be implemented using an ensemble ranking technique. The ensemble ranking technique is capable of combining ranks assigned to each digital image of the plurality of digital images 200 by multiple crowdworkers to obtain the final rank. The ensemble ranking technique first normalizes the output ranking scores obtained from multiple crowdworkers for each digital image of the plurality of digital images 200 and then combines the normalized ranking scores by weights that are usually tuned empirically.

In an embodiment, the ensemble ranking technique calculates a Borda Count score for each digital image of the plurality of digital images 200. According to the present disclosure, the Borda count is a single winner election method in which crowdworkers rank digital images of the plurality of digital images 200 in each of the plurality of groups in order of preference. The Borda count determines the winner of an election by giving each digital image of the plurality of digital images 200 a certain number of points corresponding to the position in which the digital image of the plurality of digital images 200 is ranked by each crowdworker. Once all votes have been counted, the digital image of the plurality of digital images 200 with the most points is the winner.

In an embodiment, the Borda score for a digital image "i", with ranks is calculated as follows:

$$x_i = \varphi(\tau_1, \ldots, \tau_l) = \sum_{k=1}^{l} \alpha_k x_i^{(k)}$$

In the above equation, $x_i^k = \sum_j 1 (i \succ \tau_k j)$ indicates the number of times the digital image "i" is ranked higher than a digital image "j" on the rank $\tau_k$. $\alpha$ is a parameter that represents the measure of reliability of each crowdworker.

In an embodiment, when $\alpha_i = 1$, the ranks assigned by each of the crowdworkers are given equal importance. In another embodiment, the reliability of each of the crowdworkers may be different than others (i.e., $\alpha = \alpha_1, \ldots, \alpha_l$). In an embodiment, $\alpha$ can be periodically estimated for each crowdworker after a number of ranking tasks have been completed by said crowdworkers.

In an embodiment, the ranking module 114 is configured to assign a highest final rank to the digital image in each of the plurality of groups (the first group 302, the second group 304, and the third group 306), which was ranked highest by majority of the one or more crowdworkers.

In an embodiment, the ranking module 114 is configured to eliminate one or more digital images from each group of the plurality of groups (the first group 302, the second group 304, and the third group 306) assigned a rank below a pre-defined value. The pre-define value is defined by the administrator of the system 100. In another embodiment, the ranking module 114 is further configured to eliminate the digital image in each of the plurality of groups (the first group 302, the second group 304, and the third group 306), which was ranked lowest by a majority of one or more crowdworkers.

In an embodiment, the ranking module 114 is further configured to automatically assign various ranks to each digital image in the plurality of the groups. The ranking module 114 then calculates the final rank based on the automatically assigned ranks and the distributing of the ranking tasks can be avoided. In another embodiment, the ranking module 114 calculates the final rank for each digital image based on the corresponding automatically assigned rank and the corresponding one or more ranks assigned by the one or more crowdworkers.

The album creation module 116 is configured for creating the digital image album having at least one digital image selected from each of the plurality of groups (the first group 302, the second group 304, and the third group 306) based on the final rank assigned to each digital image. In an embodiment, the album creation module 116 selects the digital image having the highest final rank from each of the plurality of groups (the first group 302, the second group 304, and the third group 306) for creating the digital image album. It will be understood by a person having ordinary skill in the art that the album creation module can select any number of digital images from each of the plurality of groups based on the corresponding final rank for creating the digital image album.

In an embodiment, the album creation module 116 selects the digital image 204 from the first group 302, the digital image 206 from the second group 304, and the digital image 218 from the third group to create the digital image album.

Figure 6:
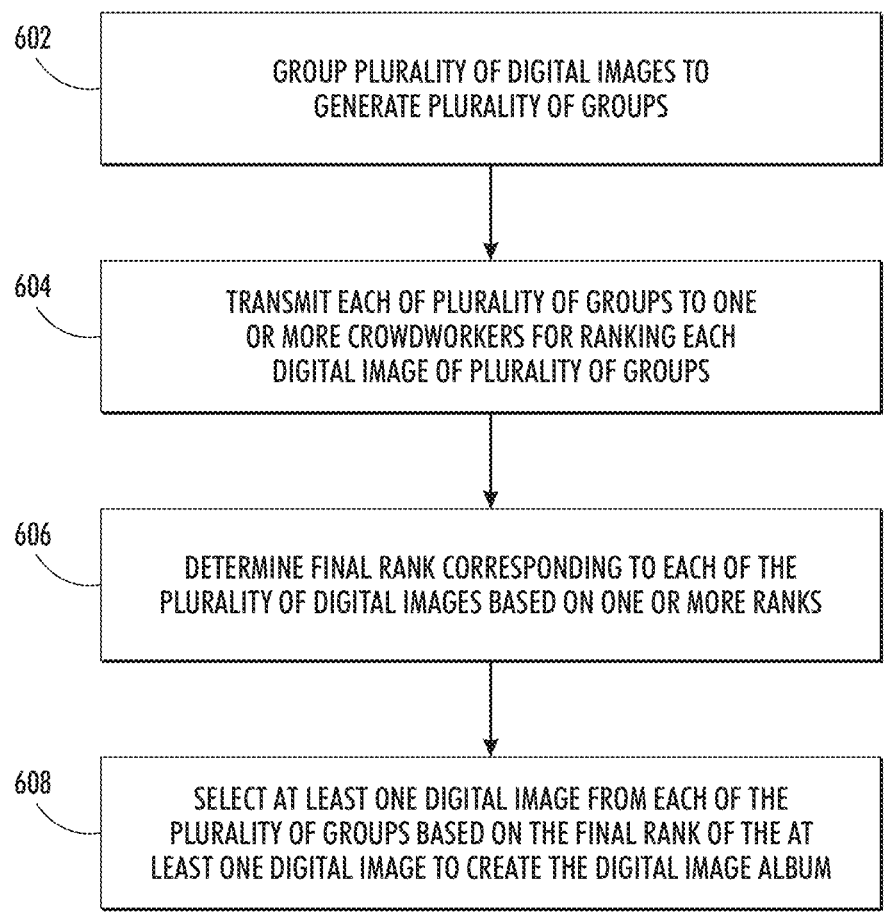
FIG. 6 is a flow diagram illustrating a method for creating a digital image album in accordance with at least one embodiment.

FIG. 6 is a flow diagram illustrating a method for creating a digital image album in accordance with at least one embodiment.

At step 602, the plurality of digital images 200 are grouped together to generate the plurality of groups. In an embodiment, the plurality of digital images 200 are grouped together by the grouping module 110. The grouping module 110 retrieves the plurality of digital images 200 from the database 118 and thereafter groups the plurality of digital images 200 in a plurality of groups. The plurality of groups includes the first group 302, the second group 304, and the third group 306. This is further explained in detail in conjunction with FIG. 1.

At step 604, each of the plurality of groups is distributed to one or more crowdworkers for ranking each digital image of the plurality of groups. In an embodiment, the distribution of each of the plurality of groups to one or more crowdworkers is performed by the distribution module 112. In order to distribute the plurality of groups, the distribution module 112 creates a ranking task corresponding to each of the plurality of groups for the one or more crowdworkers. The ranking task (containing the corresponding group of the plurality of groups) specifies the objective of ranking each digital image of the plurality of digital images 200. Thus, the one or more crowdworkers rank each digital image in their order of preference. This is further explained in detail in conjunction with FIG. 1.

At step 606, the final rank corresponding to each of the plurality of digital images 200 is determined based on the one or more ranks assigned by the one or more crowdworkers to each digital image of the plurality of digital images 200 of the plurality of groups. In an embodiment, the final rank is assigned to each digital image of the plurality of digital images 200 by the ranking module 114. This is further explained in detail in conjunction with FIG. 1.

At step 608, at least one digital image from each of the plurality of groups is selected based on the final rank of at least one digital image to create the digital image album. In an embodiment, the digital image album is created by the album creation module 116. In an embodiment, the album creation module 116 selects the digital image assigned the highest rank from each of the plurality of groups. This is further explained in detail in conjunction with FIG. 1.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product for creating a digital image album by crowdsourcing, as described above, have various advantages. The disclosed method and system enable the creation of photo albums where otherwise users would not create an album due to the amount of work required to select the photos for the album from a huge set of possible input photographs (i.e., digital images). In addition, the user (owner of the digital images) saves time and effort to organize and maintain the digital images.

Various embodiments of the method and system for creating the digital image album have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for creating a digital image album implementable on a computing device, the method comprising:
    grouping, by one or more processors, a first plurality of digital images to generate a plurality of groups, wherein each of the plurality of groups comprises a second plurality of digital images;
    distributing, by the one or more processors through an input/output interface, each of the plurality of groups to one or more crowdworkers for ranking each digital image of the plurality of groups;
    receiving, by the one or more processors through the input/output interface, a response from the one or more crowdworkers, wherein the response corresponds to a first rank assigned to each digital image in the second plurality of digital images in each of the plurality of groups;
    eliminating, by the one or more processors, one or more digital images from the second plurality of digital images in each of the plurality of groups based on the first rank and a pre-defined value, to create a plurality of modified groups;
    determining, by the one or more processors, a final rank corresponding to the each digital image in the plurality of modified groups based on the first rank assigned by the one or more crowdworkers to each digital image of the plurality of groups; and selecting, by the one or more processors, a third plurality of digital images from each of the plurality of modified groups based on the final rank of the each digital image of the plurality of modified groups, wherein the at third plurality of selected digital images is used to create the digital image album.

2. The method of claim 1, wherein each of the plurality of groups comprises one or more digital images having a common visual characteristic.

3. The method of claim 1, wherein the distribution comprises creating a ranking task corresponding to each of the plurality of groups for the one or more crowdworkers.

4. The method of claim 1, wherein the digital image album comprises at least a digital image having a highest final rank from each group of the plurality of modified groups.

5. The method of claim 1 further comprising automatically ranking, by the one or more processors, the each digital image of the plurality of groups, wherein the final rank corresponding to the each digital image of the plurality of modified groups is determined based on at least one of a corresponding automatically assigned rank or the first rank assigned by the one or more crowdworkers to the each digital image of the plurality of groups.

6. A system for creating a digital image album, the system comprising one or more processors configured to:
group a first plurality of digital images to generate a plurality of groups, wherein each of the plurality of groups comprises a second plurality of digital images;
distribute, through an input/output interface each group of the plurality of groups to one or more crowdworkers for ranking each digital image of the plurality of groups;
receive, through the input/output interface a response from the one or more crowdworkers, wherein the response corresponds to a first rank assigned to each digital image in the second plurality of digital images in each of the plurality of groups;
eliminate one or more digital images from the second plurality of digital images in each of the plurality of groups based on the first rank and pre-defined value, to create a plurality of modified groups;
assign a final rank to the each digital image of the plurality of modified groups based on the first rank assigned by the one or more crowdworkers to the each digital image of the plurality of groups; and
create the digital image album having a third plurality of digital images selected from each of the plurality of modified groups, wherein the third plurality of digital images is selected based on the final rank assigned to the each digital image of the plurality of modified groups.

7. The system of claim 6 further comprising a database for storing the first plurality of digital images.

8. The system of claim 6, wherein the one or more processors are configured to combine the first rank assigned, by the one or more crowdworkers, to the each digital image of the plurality of groups to determine the final rank for the each digital image of the plurality of modified groups, wherein the first rank corresponding to the each digital image of the plurality of groups are combined based on an ensemble ranking technique, wherein the ensemble ranking technique comprises:
determining a number of times a digital image, in a group, has been ranked higher than other digital images in the group,
determining a reputation of each of the one or more crowdworkers, and
wherein the final rank is determined based on the number of times and the reputation of each of the one or more crowdworkers.

9. The system of claim 6, wherein the processors are configured to assign a highest final rank to the digital image in each of the plurality of modified groups, which was ranked highest by a majority of one or more crowdworkers.

10. A computer program product for use with a computer, the computer program product comprising a non-transitory computer-usable data carrier storing a computer-readable program code for creating a digital image album, the computer-readable program code is executable by a processor in the computer to:
group a first plurality of digital images to generate a plurality of groups, wherein each of the plurality of groups comprises a second plurality of digital images;
distribute, through an input/output interface, each of the plurality of groups to one or more crowdworkers for ranking each digital image of the plurality of groups;
receive, through the input/output interface, a response from the one or more crowdworkers, wherein the response corresponds to a first rank assigned to each digital image in the second plurality of digital images in each of the plurality of groups;
eliminate one or more digital images from the second of digital images in each of the plurality of groups based on the first rank and a pre-defined value, to create a plurality of modified groups;
determine a final rank corresponding to the each digital image of the plurality of modified groups based on the first rank assigned by the one or more crowdworkers to the each digital image of the plurality of groups; and
select a third plurality of digital images from each of the plurality of modified groups based on the final rank of the each digital image of the plurality of modified groups, wherein the third plurality of selected digital images is used to create the digital image album.

11. The computer program product of claim 10, wherein each of the plurality of groups comprises one or more digital images having a common visual characteristic.

12. The computer program product of claim 10, wherein the computer-readable program code is executable by the processor in the computer to create a ranking task corresponding to each of the plurality of groups for the one or more crowdworkers.

* * * * *